(12) United States Patent
Horie et al.

(10) Patent No.: US 12,191,439 B2
(45) Date of Patent: Jan. 7, 2025

(54) NONAQUEOUS ELECTROLYTE SECONDARY BATTERY POROUS LAYER

(71) Applicant: Sumitomo Chemical Company, Limited, Tokyo (JP)

(72) Inventors: Kensaku Horie, Niihama (JP); Yuichiro Azuma, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 452 days.

(21) Appl. No.: 16/848,885

(22) Filed: Apr. 15, 2020

(65) Prior Publication Data

US 2020/0335757 A1 Oct. 22, 2020

(30) Foreign Application Priority Data

Apr. 16, 2019 (JP) ................. 2019-078119

(51) Int. Cl.
*H01M 10/0525* (2010.01)
*H01M 50/417* (2021.01)
*H01M 50/423* (2021.01)
*H01M 50/451* (2021.01)
*H01M 50/489* (2021.01)

(52) U.S. Cl.
CPC ..... *H01M 10/0525* (2013.01); *H01M 50/417* (2021.01); *H01M 50/423* (2021.01); *H01M 50/451* (2021.01); *H01M 50/489* (2021.01)

(58) Field of Classification Search
CPC ............. H01M 50/411; H01M 50/449; H01M 10/0525
See application file for complete search history.

(56) References Cited

U.S. PATENT DOCUMENTS

| 9,065,121 | B2* | 6/2015 | Kajita | H01M 50/411 |
| 2008/0075935 | A1 | 3/2008 | Iida et al. | |
| 2012/0164538 | A1* | 6/2012 | Inagaki | H01M 50/494 |
| | | | | 242/159 |
| 2013/0059192 | A1 | 3/2013 | Kajita et al. | |
| 2015/0050545 | A1* | 2/2015 | Murata | H01M 50/417 |
| | | | | 429/145 |
| 2015/0236323 | A1* | 8/2015 | Honda | H01M 50/489 |
| | | | | 429/144 |
| 2017/0141372 | A1 | 5/2017 | Suzuki et al. | |
| 2018/0097216 | A1 | 4/2018 | Joo et al. | |
| 2018/0114968 | A1 | 4/2018 | Joo et al. | |
| 2018/0175353 | A1* | 6/2018 | Sakimoto | B32B 3/26 |
| 2018/0277843 | A1 | 9/2018 | Yasuda et al. | |
| 2018/0315970 | A1 | 11/2018 | Terashima et al. | |

FOREIGN PATENT DOCUMENTS

| CN | 1964841 | A | | 5/2007 |
| CN | 107112477 | A | | 8/2017 |
| CN | 107438912 | A | | 12/2017 |
| CN | 108630893 | A | | 10/2018 |
| JP | 2008293786 | | * | 4/2008 |
| JP | 2008293786 | A | * | 4/2008 |
| JP | 2012119224 | | * | 6/2012 |
| JP | 2012119224 | A | * | 6/2012 |
| JP | 2014-040580 | A | | 3/2014 |
| JP | 2016072154 | | * | 5/2016 |
| JP | 2016072154 | A | * | 5/2016 |
| JP | 5994354 | B2 | | 9/2016 |
| JP | 6123006 | B1 | * | 9/2017 |
| JP | 2018016078 | A | | 2/2018 |
| JP | 6213006 | | * | 9/2021 |

OTHER PUBLICATIONS

Office Action issued Nov. 1, 2022 in JP Application No. 2019-078119 (with partial English machine translation).
Office Action issued Mar. 10, 2023 in CN Application No. 202010300710.1.
Office Action issued Aug. 8, 2023 in CN Application No. 202010300710.1.
Office Action issued Dec. 1, 2023 in DE Application No. 102020204792.8.

* cited by examiner

*Primary Examiner* — Osei K Amponsah
(74) *Attorney, Agent, or Firm* — Panitch Schwarze Belisario & Nadel LLP

(57) ABSTRACT

An aspect of the present invention provides a nonaqueous electrolyte secondary battery porous layer that has both favorable ion permeability and favorable peeling strength. A nonaqueous electrolyte secondary battery porous layer in accordance with an aspect of the present invention includes: a resin; and a filler, the nonaqueous electrolyte secondary battery porous layer having a thickness of less than 8.0 μm, the nonaqueous electrolyte secondary battery porous layer having a surface roughness (Ra) of not more than 0.15 μm.

9 Claims, No Drawings

NONAQUEOUS ELECTROLYTE SECONDARY BATTERY POROUS LAYER

This Nonprovisional application claims priority under 35 U.S.C. § 119 on Patent Application No. 2019-078119 filed in Japan on Apr. 16, 2019, the entire contents of which are hereby incorporated by reference.

TECHNICAL FIELD

The present invention relates to a porous layer for a nonaqueous electrolyte secondary battery (hereinafter referred to as a "nonaqueous electrolyte secondary battery porous layer").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

A nonaqueous electrolyte secondary battery includes a separator as a member thereof. A variety of types of separators have also been developed in order to improve the performance of nonaqueous electrolyte secondary batteries. For example, Patent Literature 1 discloses a separator for a nonaqueous electrolyte secondary battery (hereinafter referred to as a "nonaqueous electrolyte secondary battery separator") which has a surface layer. The surface layer is specified in terms of e.g. the specific average particle diameter of inorganic particles contained in the surface layer, and the arithmetic mean roughness (Sa) of the surface of the surface layer.

CITATION LIST

Patent Literature

[Patent Literature 1]
Specification of Japanese Patent No. 5994354

SUMMARY OF INVENTION

Technical Problem

Recently, as battery capacity has increased, there has been a demand for further decreases in the thickness of separators. However, further decreases in the thickness of a porous layer have made it even more difficult to achieve both favorable ion permeability and a high peeling strength. Prior art such as that described above has room for improvement in terms of achieving both favorable ion permeability and favorable peeling strength while also having a thinner separator.

An object of an aspect of the present invention is to provide a nonaqueous electrolyte secondary battery porous layer that has both favorable ion permeability and favorable peeling strength.

Solution to Problem

In order to solve the above problem, as a result of diligent research, the inventors of the present invention arrived at the present invention after discovering that it is possible to improve the ion permeability of a nonaqueous electrolyte secondary battery porous layer and achieve favorable peeling strength in a nonaqueous electrolyte secondary battery laminated separator including the porous layer by controlling the surface roughness of the porous layer to be not more than a predetermined value. In other words, the present invention includes the following configurations.

<1>
A nonaqueous electrolyte secondary battery porous layer including:
  a resin; and
  a filler,
    the nonaqueous electrolyte secondary battery porous layer having a thickness of less than 8.0 μm,
    the nonaqueous electrolyte secondary battery porous layer having a surface roughness (Ra) of not more than 0.15 μm.

<2>
The nonaqueous electrolyte secondary battery porous layer according to <1>, wherein out of particles of the filler, a proportion of particles having a particle diameter of not less than 1.0 μm is not more than 5.0%, where 100% represents the total number of particles of the filler.

<3>
The nonaqueous electrolyte secondary battery porous layer according to <1> or <2>, wherein a content ratio of the resin is not less than 40 weight % and not more than 80 weight %, where 100 weight % represents the total weight of the nonaqueous electrolyte secondary battery porous layer.

<4>
The nonaqueous electrolyte secondary battery porous layer according to any one of <1> to <3>, wherein a weight per unit area per one nonaqueous electrolyte secondary battery porous layer is not less than 0.5 $g/m^2$ and not more than 2.5 $g/m^2$.

<5>
The nonaqueous electrolyte secondary battery porous layer according to any one of <1> to <4>, wherein the resin is at least one selected from the group consisting of a polyolefin, a (meth)acrylate-based resin, a fluorine-containing resin, a polyamide-based resin, a polyester-based resin, and a water-soluble polymer.

<6>
The nonaqueous electrolyte secondary battery porous layer according to <5>, wherein the polyamide-based resin is an aramid resin.

<7>
A nonaqueous electrolyte secondary battery laminated separator including:
  a polyolefin porous film; and
  the nonaqueous electrolyte secondary battery porous layer according to any one of <1> to <6>, the nonaqueous electrolyte secondary battery porous layer being formed on at least one surface of the polyolefin porous film.

<8>
A nonaqueous electrolyte secondary battery member including:
  a positive electrode;
  the nonaqueous electrolyte secondary battery porous layer according to any one of <1> to <6> or the nonaqueous electrolyte secondary battery laminated separator according to <7>; and
  a negative electrode,
    the positive electrode, the nonaqueous electrolyte secondary battery porous layer or the nonaqueous electrolyte secondary battery laminated separator, and the negative electrode being arranged in this order.

<9>

A nonaqueous electrolyte secondary battery including: the nonaqueous electrolyte secondary battery porous layer according to any one of <1> to <6>, the nonaqueous electrolyte secondary battery laminated separator according to <7>, or the nonaqueous electrolyte secondary battery member according to <8>.

Advantageous Effects of Invention

An aspect of the present invention provides a nonaqueous electrolyte secondary battery porous layer that has both favorable ion permeability and favorable peeling strength.

DESCRIPTION OF EMBODIMENTS

The following description will discuss embodiments of the present invention. Note, however, that the present invention is not limited to these embodiments. The present invention is not limited to arrangements described below, but may be altered in various ways by a skilled person within the scope of the claims. The present invention also encompasses, in its technical scope, any embodiment derived by combining technical means disclosed in differing embodiments.

Any numerical range expressed as "A to B" herein means "not less than A and not more than B" unless otherwise stated.

[1. Nonaqueous Electrolyte Secondary Battery Porous Layer]

A nonaqueous electrolyte secondary battery porous layer in accordance with an embodiment of the present invention includes: a resin; and a filler, the nonaqueous electrolyte secondary battery porous layer having a thickness of less than 8.0 µm, the nonaqueous electrolyte secondary battery porous layer having a surface roughness (Ra) of not more than 0.15 µm. Hereinafter, a nonaqueous electrolyte secondary battery porous layer may also be referred to simply as a "porous layer".

The porous layer in accordance with an embodiment of the present invention has a surface roughness of not more than 0.15 µm, preferably not more than 0.14 µm, and more preferably not more than 0.13 µm.

The "surface roughness" of the porous layer refers to an average value of absolute values of distance from a mean line in a profile of the surface of the porous layer. The surface roughness can be measured e.g. with use of a non-contact measurement device (see the Examples for details). In one embodiment, the surface roughness of the porous layer in both the machine direction (MD) and the transverse direction (TD) is not more than 0.15 µm, preferably not more than 0.14 µm, and more preferably not more than 0.13 µm. The term "machine direction" (MD) refers to a direction in which the porous film or laminated separator is transferred during production. The term "transverse direction" (TD) refers to a direction which is (i) parallel to the surface of the porous film or laminated separator and (ii) perpendicular to the MD.

The surface roughness of the porous layer is preferably a low as possible, but the minimum value thereof may be set to, for example, 0.01 µm. In other words, in an embodiment of the present invention, the surface roughness of the porous layer is not less than 0.01 µm. In another embodiment, the surface roughness of the porous layer in both the MD and the TD is not less than 0.01 µm.

The porous layer, as a member included in a nonaqueous electrolyte secondary battery, can be provided between (i) a polyolefin porous film and (ii) at least one of a positive electrode and a negative electrode. The porous layer can be provided on one surface of the polyolefin porous film or on both surfaces of the polyolefin porous film. Alternatively, the porous layer can be provided on an active material layer of at least one of the positive electrode and the negative electrode. Alternatively, the porous layer can be provided between (i) the polyolefin porous film and (ii) at least one of the positive electrode and the negative electrode, in a manner so as to be in contact with the polyolefin porous film and the at least one of the positive electrode and the negative electrode. The number of porous layer(s) provided between (i) the polyolefin porous film and (ii) at least one of the positive electrode and the negative electrode can be one, two, or more. The porous layer is preferably an insulating porous layer containing a resin.

In a case where the porous layer is formed on one surface of the polyolefin porous film, the porous layer is preferably formed on a surface of the polyolefin porous film which surface faces the positive electrode. The porous layer is more preferably formed on a surface which makes contact with the positive electrode.

[Resin]

It is preferable that the resin used in the porous layer be insoluble in the electrolyte of the battery and be electrochemically stable when the battery is in normal use.

Examples of resin(s) used in the porous layer encompass polyolefins; (meth)acrylate-based resins; fluorine-containing resins; polyamide-based resins; polyimide-based resins; polyester-based resins; rubbers; resins having a melting point or a glass transition temperature of not lower than 180° C.; water-soluble polymers; polycarbonate, polyacetal, and polyether ether ketone.

Of the above resins, polyolefins, (meth)acrylate-based resins, fluorine-containing resins, polyamide-based resins, polyester-based resins, and water-soluble polymers are preferable.

Preferable examples of the polyolefins encompass polyethylene, polypropylene, polybutene, and an ethylene-propylene copolymer.

Examples of the fluorine-containing resins encompass polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer, and particularly fluorine-containing rubber having a glass transition temperature of not higher than 23° C.

As the polyamide-based resins, aramid resins such as aromatic polyamides and wholly aromatic polyamides are preferable.

Specific examples of the aramid resins encompass poly (paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly (metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide) is more preferable.

The polyester-based resins are preferably aromatic polyesters such as polyarylates, or liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the resins having a melting point or a glass transition temperature of not lower than 180° C. encompass polyphenylene ether, polysulfone, polyether sulfone, polyphenylene sulfide, polyetherimide, polyamide imide, and polyether amide.

Examples of the water-soluble polymers encompass polyvinyl alcohol, polyethylene glycol, cellulose ether, sodium alginate, polyacrylic acid, polyacrylamide, and polymethacrylic acid.

The porous layer may contain only one of the above resins or two or more of the above resins in combination.

The amount of resin contained in the porous layer is preferably 40 weight % to 80 weight %, and more preferably 40 weight % to 70 weight %, where "100 weight %" represents the total weight of the porous layer. In a case where the amount of resin contained falls within the above ranges, there is increased adhesiveness when the porous layer is formed on the base material, and the porous layer has a higher peeling strength.

[Filler]

In an embodiment of the present invention, a filler included in the porous layer may be an inorganic filler or an organic filler. The filler is more preferably an inorganic filler made of an inorganic oxide such as silica, calcium oxide, magnesium oxide, titanium oxide, alumina, mica, zeolite, aluminum hydroxide, or boehmite.

Of the filler included in the porous layer, a proportion of particles having a particle diameter of not less than 1.0 µm is preferably not more than 5.0%, more preferably not more than 3.0%, and even more preferably not more than 2.0%, where "100%" represents the total number of the particles of the filler. These values can be calculated by, for example, using a granulometer to determine a particle number-based particle size distribution of the filler particles. When determining the particle number-based particle size distribution, extremely small microparticles having a particle diameter of not more than 0.02 µm are excluded from the measurement.

In a case where the particle diameter of the filler included in the porous layer satisfies the above conditions, it can be said that the porous layer has a low proportion of filler particles having a large diameter (or includes no filler particles having a large particle diameter). In a case where such a porous layer is formed on a base material, there is an increased tendency for the resin to be distributed at the interface between the porous layer and the base material. As such, there is improved adhesiveness between the porous layer and the base material, and the porous layer has a high peeling strength. In other words, it becomes possible to increase the peeling strength of a thin porous layer.

When the porous layer has a low proportion of filler particles having a large particle diameter, there tends to be a decrease in the surface roughness of the porous layer. When the porous layer has a high proportion of filler particles having a large particle diameter, there tends to be an increase in the surface roughness of the porous layer. This is because the filler particles protrude from the surface of the porous layer and increase unevenness of the surface.

In other words, the proportion of filler having a large particle diameter is both a predominant factor affecting the peeling strength and a predominant factor affecting the surface roughness of the porous layer.

The amount of filler contained in the porous layer is preferably 20 weight % to 60 weight %, and more preferably 30 weight % to 60 weight %, where "100 weight %" represents the total weight of the porous layer. In a case where the amount of filler contained falls within the above ranges, it is possible to obtain sufficient ion permeability.

The porous layer is preferably provided between the polyolefin porous film and a positive electrode active material layer of the positive electrode. The descriptions below of the physical properties of the porous layer describe at least the physical properties of a porous layer disposed between the polyolefin porous film and the positive electrode active material layer of the positive electrode in a nonaqueous electrolyte secondary battery.

The porous layer has a thickness of preferably less than 8 µm, more preferably not more than 5 µm, and even more preferably not more than 4 µm, per one porous layer. Setting the thickness of the porous layer to be less than 8 µm (per one porous layer) decreases resistance to lithium ion permeation in the nonaqueous electrolyte secondary battery and therefore makes it possible to reduce a decrease in a rate characteristic and cycle characteristic. Setting the thickness of the porous layer to be less than 8 µm (per one porous layer) also reduces an increase in distance between the positive electrode and negative electrode, and therefore makes it possible to reduce a decrease in the internal volume efficiency of the nonaqueous electrolyte secondary battery. The thickness of the porous layer is preferably not less than 0.5 µm and more preferably not less than 1 µm, per one porous layer. The porous layer having a thickness of not less than 0.5 µm (per one porous layer) makes it possible to sufficiently prevent an internal short circuit caused by e.g. damage to the nonaqueous electrolyte secondary battery, and also to retain a sufficient amount of the electrolyte in the porous layer. Setting the thickness of the porous layer (thickness per one porous layer) to be within the above range makes it possible to achieve adhesiveness with an electrode and high energy density. An embodiment of the present invention makes it possible to achieve both favorable ion permeability and high peeling strength in the porous layer, even when the porous layer is thin as described above.

The weight per unit area of the porous layer can be appropriately determined in view of the strength, thickness, weight, and handleability of the porous layer. The weight per unit area of the porous layer is preferably 0.5 g/m² to 2.5 g/m², and more preferably 1.0 g/m² to 2.5 g/m², per one porous layer. A porous layer having a weight per unit area within the above numerical ranges allows a nonaqueous electrolyte secondary battery including the porous layer to have a higher weight energy density and a higher volume energy density. A porous layer whose weight per unit area exceeds the above ranges tends to cause a nonaqueous electrolyte secondary battery to be heavy.

The porous layer has a porosity of preferably 20% by volume to 90% by volume, and more preferably 30% by volume to 80% by volume, in order to achieve sufficient ion permeability. The pores in the porous layer have a diameter of preferably not more than 1.0 µm, and more preferably not more than 0.5 µm. In a case where the pores each have such a diameter, the porous layer can achieve sufficient ion permeability in a nonaqueous electrolyte secondary battery.

The porous layer has an air permeability of preferably 30 s/100 mL to 80 s/100 mL, and more preferably 40 s/100 mL to 75 s/100 mL, in terms of Gurley values. In a case where the porous layer has an air permeability falling within the above ranges, it can be said that the porous layer has sufficient ion permeability.

[2. Method of Producing Nonaqueous Electrolyte Secondary Battery Porous Layer]

The porous layer can be formed with use of a coating solution which is obtained by (i) dissolving or dispersing resin in a solvent and (ii) dispersing a filler in the solvent. The solvent can be described as both a solvent in which the resin is dissolved and a dispersion medium in which the resin or filler is dispersed. Examples of a method for forming the coating solution encompass a mechanical stirring method, an ultrasonic dispersion method, a high-pressure dispersion method, and a media dispersion method.

The porous layer can be formed by, for example, the following methods: (i) applying the coating solution directly to a surface of a base material and then removing the solvent, (ii) applying the coating solution to a suitable support, subsequently removing the solvent so as to form a porous layer, pressure-bonding the porous layer to the base material, and peeling the support off, (iii) applying the coating solution to a surface of a suitable support, pressure-bonding the base material to a coating surface, peeling the support off, and then removing the solvent, or (iv) carrying out dip coating by immersing the base material into the coating solution, and then removing the solvent.

The solvent preferably (i) does not have an adverse effect on the base material, (ii) allows the resin to be uniformly and stably dissolved in the solvent, and (iii) allows the filler to be uniformly and stably dispersed in the solvent. Examples of the solvent encompass N-methyl-2-pyrrolidone, N,N-dimethylacetamide, N,N-dimethylformamide, acetone, and water.

As necessary, the coating solution may contain, as a component(s) other than the resin and the filler, for example, a dispersing agent, a plasticizer, a surfactant, and/or a pH adjusting agent.

Examples of the base material other than the polyolefin porous film encompass a film other than the polyolefin porous film, a positive electrode, and a negative electrode.

The coating solution can be applied to the base material by a conventionally known method. Specific examples of such a method encompass a gravure coater method, a dip coater method, a bar coater method, and a die coater method.

In a case where the coating solution includes an aramid resin, the aramid resin can be deposited by applying moisture to the coating surface. The porous layer may be formed in this way.

When manufacturing the porous layer in accordance with an embodiment of the present invention, it is preferable to shorten the length of time from (i) when the coating solution is applied to (ii) when the solvent is removed and the resin is deposited. Conventionally, no particular attention has been paid to the length of this time. The length of time from when the coating solution is applied to when the resin is deposited is preferably not more than 13 seconds, more preferably not more than 10 seconds, and even more preferably not more than 8 seconds.

In a case where the length of time from when the coating solution is applied to when the resin is deposited is not more than 13 seconds, it is possible deposit the resin in a state where the filler particles are uniformly distributed in the coating film (the film consisting of the coating solution coated onto e.g. the base material). As such, there is a uniform distribution of pores in the porous layer formed, and the resulting porous layer will have excellent ion permeability. Conversely, in a case where the length of time from when the coating solution is applied to when the resin is deposited exceeds 13 seconds, the resin will be deposited in a state where the filler particles have sedimented in the coating film. As such, there is an uneven distribution of pores in the porous layer formed, and the resulting porous layer will have inferior ion permeability.

In a case where the length of time from when the coating solution is applied to when the resin is deposited is not more than 13 seconds, it is possible deposit the resin in a state where the filler particles are uniformly distributed in the coating film. As such, there is a uniform distribution of filler particles in the porous layer formed, and the resulting porous layer will have excellent peeling strength. Conversely, in a case where the length of time from when the coating solution is applied to when the resin is deposited exceeds 13 seconds, the resin will be deposited in a state where the filler particles have sedimented in the coating film. As such, there will be an increased proportion of filler particles toward the interface between the base material and the porous layer that is formed, and the proportion of the resin at the interface will be decreased. This results in a porous layer which has inferior peeling strength.

Note also that, in a case where the length of time from when the coating solution is applied to when the resin is deposited is short, the surface roughness of the porous layer tends to decrease, and in a case where the length of time is long, the surface roughness of the porous layer tends to increase. This because the surface of the coating film which had been smoothed with e.g. a bar during coating becomes rougher with time.

In other words, the length of time from when the coating solution is applied to when the resin is deposited is a predominant factor affecting ion permeability, a predominant factor affecting peeling strength, and a predominant factor affecting the surface roughness of the porous layer.

As such, by measuring the surface roughness of the porous layer, it is possible to determine whether or not the porous layer has excellent peeling strength, and whether or not the porous layer has excellent ion permeability.

[Method of Producing Aramid Resin]

Examples of a method of preparing the aramid resin encompass, but are not particularly limited to, condensation polymerization of para-oriented aromatic diamine and para-oriented aromatic dicarboxylic acid halide. In such a method, the aramid resin obtained is substantially composed of repeating units in which amide bonds occur at para or quasi-para positions of the aromatic ring. "Quasi-para positions" refers to positions at which bonds extend in opposing directions from each other, coaxially or in parallel, such as 4 and 4' positions of biphenylene, 1 and 5 positions of naphthalene, and 2 and 6 positions of naphthalene.

A solution of poly(paraphenylene terephthalamide) can be prepared by, for example, a method including the following specific steps (I) through (IV).

(I) N-methyl-2-pyrrolidone is introduced into a dried flask. Then, calcium chloride which has been dried at 200° C. for 2 hours is added. Then, the flask is heated to 100° C. to completely dissolve the calcium chloride.

(II) The solution obtained in the step (I) is returned to room temperature, and then paraphenylenediamine is added and completely dissolved.

(III) While a temperature of the solution obtained in the step (II) is maintained at 20±2° C., terephthalic acid dichloride is added, the terephthalic acid dichloride being divided into 10 separate identical portions added at approximately 5-minute intervals.

(IV) While a temperature of the solution obtained in the step (III) is maintained at 20±2° C., the solution is matured for 1 hour, and is then stirred under reduced pressure for 30 minutes to eliminate air bubbles, so that the solution of the poly(paraphenylene terephthalamide) is obtained.

[3. Nonaqueous Electrolyte Secondary Battery Laminated Separator]

A laminated separator for a nonaqueous electrolyte secondary battery (herein also referred to as a "nonaqueous electrolyte secondary battery laminated separator") in accordance with an embodiment of the present invention includes: a polyolefin porous film; and the above-described nonaqueous electrolyte secondary battery porous layer, the nonaqueous electrolyte secondary battery porous layer being formed on at least one surface of the polyolefin porous film. Hereinafter, a nonaqueous electrolyte secondary battery laminated separator may also be referred to simply as a "laminated separator".

The peeling strength of the porous layer included in the laminated separator is preferably not less than 9 N, more preferably not less than 9.5 N, and even more preferably not less than 10 N. In a laminated separator whose porous layer has a peeling strength within the above ranges, peeling of the porous layer is sufficiently prevented during e.g. cutting and winding of the laminated separator.

[Polyolefin Porous Film]

Hereinafter, a polyolefin porous film may be referred to simply as a "porous film". The porous film contains a polyolefin-based resin as a main component and has therein many pores connected to one another, so that gas and liquid can pass through the porous film from one surface to the other. A polyolefin porous film can serve as a base material for a laminated separator in which a porous layer (described later) is formed.

The porous film contains polyolefin at a proportion of not less than 50% by volume, preferably not less than 90% by volume, and more preferably not less than 95% by volume, relative to the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a high molecular weight component improves the strength of a resultant nonaqueous electrolyte secondary battery separator.

Examples of the polyolefin (thermoplastic resin) encompass a homopolymer or a copolymer each produced by polymerizing a monomer such as ethylene, propylene, 1-butene, 4-methyl-1-pentene, and 1-hexene. Examples of the homopolymer encompass polyethylene, polypropylene, and polybutene. Examples of the copolymer encompass an ethylene-propylene copolymer.

Among the above examples, polyethylene is more preferable as it is capable of preventing a flow of an excessively large electric current at a lower temperature. This preventing of an excessively large electric current is also referred to as shutdown. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable.

The porous film has a thickness of preferably 4 μm to 40 μm, more preferably 5 μm to 30 μm, and even more preferably 6 μm to 15 μm.

A weight per unit area of the porous film can be set as appropriate in view of strength, thickness, weight, and handleability. Note, however, that the weight per unit area of the porous film is preferably 4 $g/m^2$ to 20 $g/m^2$, more preferably 4 $g/m^2$ to 12 $g/m^2$, and even more preferably 5 $g/m^2$ to 10 $g/m^2$, so as to allow the nonaqueous electrolyte secondary battery to have a higher weight energy density and a higher volume energy density.

The porous film has an air permeability of preferably 30 s/100 mL to 500 s/100 mL, and more preferably 50 s/100 mL to 300 s/100 mL, in terms of Gurley values. A porous film having the above air permeability can achieve sufficient ion permeability.

The porous film has a porosity of preferably 20% by volume to 80% by volume, and more preferably 30% by volume to 75% by volume, so as to (i) retain an electrolyte in a larger amount and (ii) obtain a function of reliably preventing a flow of an excessively large electric current at a lower temperature. Further, in order to achieve sufficient ion permeability and prevent particles from entering the positive electrode and/or the negative electrode, the porous film has pores each having a pore size of preferably not more than 0.3 μm, and more preferably not more than 0.14 μm.

[4. Method of Producing Nonaqueous Electrolyte Secondary Battery Laminated Separator]

A method of producing the nonaqueous electrolyte secondary battery laminated separator in accordance with an embodiment of the present invention can be, for example, a method in which, in the above-described method for producing the nonaqueous electrolyte secondary battery porous layer, the above-described polyolefin porous film is used as the base material which is coated with the coating solution. Note that, herein, a direction in which the porous film or laminated separator is transferred during production may also be referred to as a "machine direction" (MD), and a direction which is (i) parallel to the surface of the porous film or laminated separator and (ii) perpendicular to the MD may also be referred to as a "transverse direction" (TD).

[Method of Producing Polyolefin Porous Film]

A method of producing the porous film is not particularly limited. For example, the polyolefin porous film can be produced by a method as follows. First, polyolefin-based resin is kneaded together with a pore forming agent such as an inorganic bulking agent or a plasticizer, and optionally with another agent(s) such as an antioxidant. After kneading, the kneaded substances are extruded so as to produce a polyolefin resin composition in sheet form. The pore forming agent is then removed from the polyolefin resin composition in sheet form with use of a suitable solvent. After the pore forming agent is removed, the polyolefin resin composition is stretched so that a polyolefin porous film is obtained.

The inorganic bulking agent is not particularly limited. Examples of the inorganic bulking agent encompass inorganic fillers; one specific example is calcium carbonate. The plasticizing agent is exemplified by, but not particularly limited to, a low molecular weight hydrocarbon such as liquid paraffin.

Examples of methods for producing the porous film encompass a method including the following steps.

(A) Obtaining a polyolefin resin composition by kneading ultra-high molecular weight polyethylene, low molecular weight polyethylene having a weight-average molecular weight of not more than 10,000, a pore forming agent such as calcium carbonate or a plasticizer, and an antioxidant;

(B) Forming a sheet by (i) rolling the polyolefin resin composition with use of a pair of reduction rollers and (ii) cooling the polyolefin resin composition in stages while tensioning the polyolefin resin composition with use of a take-up roller whose velocity ratio differs from that of the reduction rollers;

(C) Removing the pore forming agent from the sheet with use of a suitable solvent; and (D) Stretching the sheet, from which the pore forming agent has been removed, with use of a suitable stretch ratio.

[5. Nonaqueous Electrolyte Secondary Battery Member, Nonaqueous Electrolyte Secondary Battery]

A member for a nonaqueous electrolyte secondary battery (herein also referred to as a "nonaqueous electrolyte secondary battery member") in accordance with an embodiment of the present invention includes: a positive electrode; the above-described nonaqueous electrolyte secondary battery porous layer or nonaqueous electrolyte secondary battery laminated separator; and a negative electrode, the positive electrode, the nonaqueous electrolyte secondary battery porous layer or nonaqueous electrolyte secondary battery laminated separator, and the negative electrode being arranged in this order. A nonaqueous electrolyte secondary battery in accordance with an embodiment of the present invention includes the above-described nonaqueous electrolyte secondary battery porous layer or nonaqueous electrolyte secondary battery laminated separator. The nonaqueous electrolyte secondary battery is not particularly limited in shape and can have any shape such as the shape of a thin plate (sheet), a disk, a cylinder, or a prism such as a cuboid.

The nonaqueous electrolyte secondary battery can be produced by a publicly known conventional method. As one example, first, a nonaqueous electrolyte secondary battery member is formed by providing a positive electrode, the polyolefin porous film, and a negative electrode in this order. The porous layer can be provided between the polyolefin porous film and at least one of the positive electrode and the negative electrode. Next, the nonaqueous electrolyte secondary battery member is inserted into a container which serves as a housing for the nonaqueous electrolyte secondary battery. The container is then filled with nonaqueous electrolyte, and then hermetically sealed while pressure is reduced in the container. In this way, the nonaqueous electrolyte secondary battery can be produced.

[Positive Electrode]

The positive electrode employed in an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer, containing a positive electrode active material and a binding agent, is formed on a positive electrode current collector. The active material layer may further contain an electrically conductive agent.

Examples of the positive electrode active material encompass materials each capable of being doped with and dedoped of metal ions such as lithium ions or sodium ions. Specific examples of the materials encompass lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use only one of the above electrically conductive agents, or two or more of the above electrically conductive agents in combination.

Examples of the binding agent encompass: fluorine-based resins such as polyvinylidene fluoride (PVDF); acrylic resin; and styrene butadiene rubber. Note that the binding agent serves also as a thickener.

Examples of positive electrode current collector encompass electric conductors such as Al, Ni, and stainless steel. Of these electric conductors, Al is more preferable because Al is easily processed into a thin film and is inexpensive.

Examples of a method for producing the positive electrode sheet encompass: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

[Negative Electrode]

The negative electrode employed in an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer, containing a negative electrode active material and a binding agent, is formed on a negative electrode current collector. The active material layer may further contain an electrically conductive agent.

Examples of the negative electrode active material encompass materials each capable of being doped with and dedoped of metal ions such as lithium ions or sodium ions. Examples of the materials encompass carbonaceous materials. Examples of the carbonaceous materials encompass natural graphite, artificial graphite, cokes, carbon black, and pyrolytic carbons.

Examples of the negative electrode current collector encompass Cu, Ni, and stainless steel. Of these materials, Cu is more preferable because Cu is not easily alloyed with lithium and is easily processed into a thin film.

Examples of a method for producing the negative electrode sheet encompass: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressure is applied so that the paste is firmly fixed to the negative electrode current collector. The paste preferably contains an electrically conductive agent as described above and a binding agent as described above.

[Nonaqueous Electrolyte]

A nonaqueous electrolyte for an embodiment of the present invention is not limited to any particular one, provided that the nonaqueous electrolyte is one that is generally used for a nonaqueous electrolyte secondary battery. The nonaqueous electrolyte can be, for example, a nonaqueous electrolyte containing an organic solvent and a lithium salt dissolved therein. Examples of the lithium salt encompass $LiClO_4$, $LiPF_6$, $LiAsF_6$, $LiSbF_6$, $LiBF_4$, $LiCF_3SO_3$, LiN ($CF_3SO_2$)$_2$, $LiC(CF_3SO_2)_3$, $Li_2B_{10}Cl_{10}$, lower aliphatic carboxylic acid lithium salt, and $LiAlCl_4$. It is possible to use only one of the above lithium salts or two or more of the above lithium salts in combination.

Examples of the organic solvent to be contained in the nonaqueous electrolyte encompass carbonates, ethers, esters, nitriles, amides, carbamates, sulfur-containing compounds, and fluorine-containing organic solvents each obtained by introducing a fluorine group into any of these organic solvents. It is possible to use only one of the above organic solvents or two or more of the above organic solvents in combination.

EXAMPLES

The present invention will be described below in more detail with reference to Examples and Comparative Examples. Note, however, that the present invention is not limited to such Examples.

[Measurement Methods]

The methods used for various measurements in the Examples and Comparative Example are as follows.

[Thickness of Porous Layer]

The thicknesses of a laminated separator and a polyethylene porous film used in each Example or Comparative Example were measured with use of a high-precision digital measuring device manufactured by Mitutoyo Corporation. The thickness of the porous layer was then calculated as the difference between the thickness of the laminated separator and the thickness of the polyethylene porous film.

[Surface Roughness]

As a non-contact surface roughness measurement device, "VertScan (registered trademark) 2.0 R5500GML" manufactured by Ryoka Systems Inc. was used. The measurement conditions were as follows.

Objective lens: 5× (Michelson type)
Intermediate lens: 1×
Wavelength filter: 530 nm
CCD camera: ⅓ inch
Measurement mode: Wave
Cutoff: None The specific method used for measuring surface roughness is as follows. First, from two-dimensional data obtained at one measurement location on the porous layer, one-dimensional surface roughness Ra for a length of 250 μm was obtained for each of the MD and the TD. The above operation was carried out at a total of 5 arbitrarily selected locations on the polyolefin porous film. The resultant measurement values at the 5 locations were averaged to obtain an MD surface roughness Ra-MD and a TD surface roughness $Ra_{TD}$. The term "machine direction" (MD) refers to a direction in which the porous film or laminated separator is transferred during production. The term "transverse direction" (TD) refers to a direction which is (i) parallel to the surface of the porous film or laminated separator and (ii) perpendicular to the MD.

[Peeling Strength]

The nonaqueous electrolyte secondary battery laminated separator was cut to a size of 100 mm×27 mm. A surface of the cut piece on which no porous layer was formed was then affixed to an adherend made of glass epoxy resin, with use of double-sided tape. The above cutting was performed such that the lengthwise direction of the cut laminated separator matched the MD of the laminated separator. Next, Scotch clear tape (manufactured by 3M; width: 24 mm) was affixed to the laminated separator as tape for peeling. The test piece thus obtained was then subjected to measurement in conformance with JIS K 6854-3, the tape for peeling being adhered to the porous layer. The peeling speed used was 300 mm/min. For each of the Examples and Comparative Examples, the measurement was carried out three times, and the average of the three results was used as the peeling strength.

[Air Permeability of Porous Layer]

From the nonaqueous electrolyte secondary battery laminated separator, a piece measuring 60 mm×60 mm was cut out. An air permeability (A) of this piece of laminated separator was measured with use of a digital Oken-type air permeability testing device EGO1 manufactured by Asahi Seiko Co., Ltd. Next, after the air permeability measurement was finished, Scotch tape (manufactured by 3M) was affixed to the entire surface of the piece of laminated separator on a porous layer side, and then peeled off. This peeled the porous layer from the base material, so that a post-peeling base material was obtained. The post-peeling base material base was subjected to air permeability measurement using the above testing device, to determine an air permeability (B) of the post-peeling base material. The measured values of (A) and (B) were then used in the following formula to calculate an air permeability (C) of the porous layer.

Air permeability(*C*) of porous layer=air permeability (*A*) of laminated separator−air permeability(*B*) of post-peeling base material

Example 1

Poly(paraphenylene terephthalamide) was produced with use of a 3 L separable flask having a stirring blade, a thermometer, a nitrogen inflow tube, and a powder addition port. First, the flask was dried sufficiently, and then 2,200 g of N-methyl-2-pyrrolidone (NMP) was introduced therein. Next, 151.07 g of calcium chloride powder (which had been vacuum dried at 200° C. for 2 hours) was added. Thereafter, the flask was heated to 100° C. to completely dissolve the calcium chloride powder. The resulting solution was returned to room temperature, and then 68.23 g of paraphenylenediamine was added and completely dissolved. While a temperature of the solution was maintained at 20±2° C., 124.97 g of terephthalic acid dichloride was added, the terephthalic acid dichloride being divided into 10 separate identical portions which were added at approximately 5-minute intervals. The solution was then matured by stirring the solution for 1 hour while maintaining a temperature of 20±2° C. Thereafter, the solution was filtered through a 1500-mesh stainless steel gauze. The resulting solution had a poly(paraphenylene terephthalamide) concentration of 6 weight %.

Next, 100 g of this poly(paraphenylene terephthalamide) solution was weighed out into a flask. Thereafter, 300 g of NMP was added so as to obtain a solution in which the concentration of poly(paraphenylene terephthalamide) was 1.5 weight %. Thereafter, the solution was stirred for 60 minutes. Into this solution was mixed 6 g of Alumina C (manufactured by Nippon Aerosil Co., Ltd.; average particle diameter (D50)=0.15 μm; proportion of particles having a particle diameter of not less than 1.0 μm=1.5%, where 100% represents the total number of particles in the filler). Stirring was then performed for 240 minutes. A resultant solution was filtered through a 1000-mesh metal gauze. Thereafter, 0.73 g of calcium carbonate was added, followed by 240 minutes of stirring to achieve neutralization. The resultant solution was then defoamed under reduced pressure, so that a coating solution slurry was obtained.

The coating solution was coated onto a polyethylene porous film measuring 10.3 μm in thickness, with use of a coating bar. A coating film thus formed was then brought to a deposition step in an atmosphere having a temperature 50° C. and a relative humidity of 70%, so that the poly(paraphenylene terephthalamide) was deposited. During this operation, the length of time until the coating film formed with the coating bar entered the deposition step was 2 seconds. Finally, the coating film from which the poly (paraphenylene terephthalamide) was deposited was rinsed with water and then dried, so as to obtain a nonaqueous electrolyte secondary battery laminated separator. The laminated separator obtained had a thickness of 12.8 μm.

Example 2

A laminated separator was produced in a manner similar to Example 1, except that the amount of Alumina C added was 3 g. The laminated separator obtained had a thickness of 12.1 μm.

Comparative Example 1

A laminated separator was produced in a manner similar to Example 1, except that, as the filler, 6 g of Advanced Alumina AKP3000 (manufactured by Sumitomo Chemical Co., Ltd.; average particle diameter (D50)=0.7 m) was added in addition to the 6 g of Alumina C. The proportion of particles having a particle diameter of not less than 1.0 μm was 22.0%, where "100%" represents the total number of filler particles (total number of Alumina C and Advanced Alumina AKP3000 particles). The laminated separator obtained had a thickness of 13.9 μm.

Example 3

A laminated separator was produced in a manner similar to Example 1, except that the polyethylene porous film used had a thickness of 12.5 μm. The laminated separator obtained had a thickness of 15.5 μm.

Comparative Example 2

A laminated separator was produced in a manner similar to Example 3, except that, as the filler, 6 g of Advanced Alumina AA-03 (manufactured by Sumitomo Chemical Co., Ltd.; average particle diameter (D50)=0.3 μm) was added in addition to the 6 g of Alumina C. The proportion of particles having a particle diameter of not less than 1.0 μm was 16.3%, where "100%" represents the total number of filler particles (total number of Alumina C and Advanced Alumina AA-03 particles). The laminated separator obtained had a thickness of 16.4 μm.

Example 4

A laminated separator was produced in a manner similar to Example 1, except that the polyethylene porous film used had a thickness of 10.5 μm. The laminated separator obtained had a thickness of 12.8 μm.

Comparative Example 3

A laminated separator was produced in a manner similar to Example 4, except that, as the filler, 6 g of Advanced Alumina AA-03 (manufactured by Sumitomo Chemical Co., Ltd.; average particle diameter (D50)=0.3 μm) was added in addition to the 6 g of Alumina C. The proportion of particles having a particle diameter of not less than 1.0 μm was 16.3%, where "100%" represents the total number of filler particles (total number of Alumina C and Advanced Alumina AA-03 particles). The laminated separator obtained had a thickness of 14.0 μm.

Comparative Example 4

A laminated separator was produced in a manner similar to Example 1, except that the length of time until the coating film formed with the coating bar entered the deposition step was 15 seconds. The laminated separator obtained had a thickness of 13.1 μm.

(Results)

Table 1 shows the results of the measurements.

TABLE 1

| | Composition of porous layer | Thickness of laminated separator (μm) | Thickness of base material (μm) | Thickness of porous layer (μm) | Length of time from coating to deposition (s) | Surface roughness Ra (μm) | | Air permeability of porous layer (s/100 mL) | Peeling strength (N) |
|---|---|---|---|---|---|---|---|---|---|
| | | | | | | MD | TD | | |
| Ex. 1 | Ar/AlC = 1/1 | 12.8 | 10.3 | 2.5 | 2 | 0.069 | 0.082 | 57 | 12.4 |
| Ex. 2 | Ar/AlC = 2/1 | 12.1 | 10.3 | 1.8 | 2 | 0.065 | 0.070 | 71 | 13.7 |
| Comp. Ex. 1 | Ar/AlC/AKP3000 = 1/1/1 | 13.9 | 10.3 | 3.6 | 2 | 0.204 | 0.210 | 55 | 8.4 |
| Ex. 3 | Ar/AlC = 1/1 | 15.5 | 12.5 | 3.0 | 2 | 0.112 | 0.126 | 54 | 10.3 |
| Comp. Ex. 2 | Ar/AlC/AA-03 = 1/1/1 | 16.4 | 12.5 | 3.9 | 2 | 0.230 | 0.229 | 63 | 8.9 |
| Ex. 4 | Ar/AlC = 1/1 | 12.8 | 10.5 | 2.3 | 2 | 0.098 | 0.102 | 48 | 11.3 |
| Comp. Ex. 3 | Ar/AlC/AA-03 = 1/1/1 | 14.0 | 10.5 | 3.5 | 2 | 0.216 | 0.220 | 46 | 7.7 |
| Comp. Ex. 4 | Ar/AlC = 1/1 | 13.1 | 10.3 | 2.8 | 15 | 0.162 | 0.155 | 86 | 7.1 |

The following abbreviations are used in Table 1.

Ex: Example;

Comp. Ex.: Comparative Example;

Ar: poly(paraphenylene terephthalamide);

AlC: Alumina C;

AKP3000: Advanced Alumina AKP3000;

AA-03: Advanced Alumina AA-03;

In comparing the Examples 1 to 4 and the Comparative Examples 1 to 3, it can be seen that the content ratio of filler particles having a particle diameter of not less than 1.0 μm affects the surface roughness of the porous layer. Similarly, in comparing Example 1 and Comparative Example 4, it can be seen that the length of time from when the coating solution is applied to when the resin is deposited also affects the surface roughness of the porous layer.

The porous layers of Examples 1 to 4 each had a surface roughness of not more than 0.15 μm (in both the MD and TD) and had both excellent ion permeability and excellent peeling strength. The porous layers of Comparative Examples 1 to 4 each had a surface roughness of more than 0.15 μm (in both the MD and TD) and had relatively inferior ion permeability and peeling strength. These results suggest that the surface roughness of the porous layer can be used as a parameter in evaluating the ion permeability of the porous layer and the peeling strength of the laminated separator.

INDUSTRIAL APPLICABILITY

An aspect of the present invention can be applied to the production of a nonaqueous electrolyte secondary battery laminated separator that has both excellent ion permeability and excellent peeling strength.

The invention claimed is:

1. A nonaqueous electrolyte secondary battery laminated separator comprising:
a polyolefin porous film; and
a nonaqueous electrolyte secondary battery porous layer formed on a least one surface of the polyolefin porous film,
the nonaqueous electrolyte secondary battery porous layer comprising:
a resin; and
a filler,
the nonaqueous electrolyte secondary battery porous layer having a thickness of less than 8.0 μm,
the nonaqueous electrolyte secondary battery porous layer having a surface which is not adjacent to the polyolefin porous film, said surface have a surface roughness (Ra) of 0.01 μm to not more than 0.098 μm.

2. The nonaqueous electrolyte secondary battery laminated separator according to claim 1, wherein out of particles of the filler, a proportion of particles having a particle diameter of not less than 1.0 μm is not more than 5.0%, where 100% represents the total number of particles of the filler.

3. The nonaqueous electrolyte secondary battery laminated separator according to claim 1, wherein a content ratio of the resin is not less than 40 weight % and not more than 80 weight %, where 100 weight % represents the total weight of the nonaqueous electrolyte secondary battery porous layer.

4. The nonaqueous electrolyte secondary battery laminated separator according to claim 1, wherein a weight per unit area per one nonaqueous electrolyte secondary battery porous layer is not less than 0.5 $g/m^2$ and not more than 2.5 $g/m^2$.

5. The nonaqueous electrolyte secondary battery laminated separator according to claim 1, wherein the resin is at least one selected from the group consisting of a polyolefin, a (meth) acrylate-based resin, a fluorine-containing resin, a polyamide-based resin, a polyester-based resin, and a water-soluble polymer.

6. The nonaqueous electrolyte secondary battery laminated separator according to claim 5, wherein the polyamide-based resin is an aramid resin.

7. A nonaqueous electrolyte secondary battery member comprising:
a positive electrode;
the nonaqueous electrolyte secondary battery laminated separator according to claim 1; and
a negative electrode,
the positive electrode, the nonaqueous electrolyte secondary battery laminated separator, and the negative electrode being arranged in this order.

8. A nonaqueous electrolyte secondary battery comprising: the nonaqueous electrolyte secondary battery laminated separator according to claim 1.

9. The nonaqueous electrolyte secondary battery laminated separator according to claim 1, wherein the nonaqueous electrolyte secondary battery porous layer has a surface roughness (Ra) of 0.01 μm to not more than 0.082 μm.

* * * * *